United States Patent [19]

Walter

[11] Patent Number: 5,296,138

[45] Date of Patent: * Mar. 22, 1994

[54] UNDERDRAIN FOR LIQUID PURIFICATION SYSTEMS

[75] Inventor: Thomas P. Walter, Dallas, Pa.

[73] Assignee: Unifilt Corporation, Wilkes-Barre, Pa.

[*] Notice: The portion of the term of this patent subsequent to Nov. 26, 2008 has been disclaimed.

[21] Appl. No.: 891,523

[22] Filed: Jun. 2, 1992

Related U.S. Application Data

[63] Continuation-in-part of Ser. No. 738,089, Jul. 30, 1991, Pat. No. 5,160,613, and a continuation of Ser. No. 518,687, May 3, 1990, Pat. No. 5,068,034.

[51] Int. Cl.$^5$ .............................. B01D 24/46
[52] U.S. Cl. ................... 210/274; 210/275; 210/794
[58] Field of Search ........... 210/269, 274, 275, 291, 210/293, 279, 794

[56] References Cited

U.S. PATENT DOCUMENTS

| | | | |
|---|---|---|---|
| 649,409 | 5/1900 | Jewell | 210/274 |
| 2,710,692 | 6/1955 | Kegel | 210/274 |
| 3,110,667 | 11/1963 | Stuppy | 210/293 |
| 3,840,117 | 10/1974 | Ross | 210/274 |
| 4,065,391 | 12/1977 | Farabaugh | 210/274 |
| 4,191,652 | 3/1980 | Whitmore | 210/274 |
| 4,196,079 | 4/1980 | Ward | 210/274 |
| 4,476,020 | 10/1984 | Cheetham | 210/291 |
| 5,019,259 | 5/1991 | Hambley | 210/274 |
| 5,068,034 | 11/1991 | Walter | 210/274 |
| 5,108,627 | 4/1992 | Berkebile et al. | 210/274 |
| 5,149,427 | 9/1992 | Brown et al. | 210/274 |
| 5,156,738 | 10/1992 | Maxson | 210/274 |
| 5,160,613 | 11/1992 | Walter | 210/274 |
| 5,176,827 | 1/1993 | Walter | 210/274 |

*Primary Examiner*—Joseph W. Drodge
*Attorney, Agent, or Firm*—Caesar, Rivise, Bernstein, Cohen & Pokotilow, Ltd.

[57] ABSTRACT

An underdrain lateral for a liquid purification system is described. The lateral has three chambers, a primary chamber, a compensating chamber, and gas chamber. Turbulence is minimized during cleansing of the purification media by isolating the gas from the liquid and the backwash liquid. This is accomplished by feeding gas into the gas chamber so that the chamber is occupied by gas only during cleansing. Orifices in the wall between the primary and compensating chambers and in the baffle between the compensating and gas chambers provide compensation for even distribution of liquid in the lateral. The design also enables the use of cut outs in the gas chambers to equalize gas pressures and flow among the laterals and throughout the system bed and cut outs in the primary chambers to equalize liquid pressure and flow among the laterals and throughout the system bed. Nozzles with threaded stems having gas inlet orifices may be used and the levels of the entrances to the nozzles adjusted by rotating the stems to equalize backwash liquid flow among the nozzles. To minimize liquid pressure for greater gas flow during cleansing, an insert in the stem, adjacent the gas inlet orifices, may be added.

18 Claims, 7 Drawing Sheets

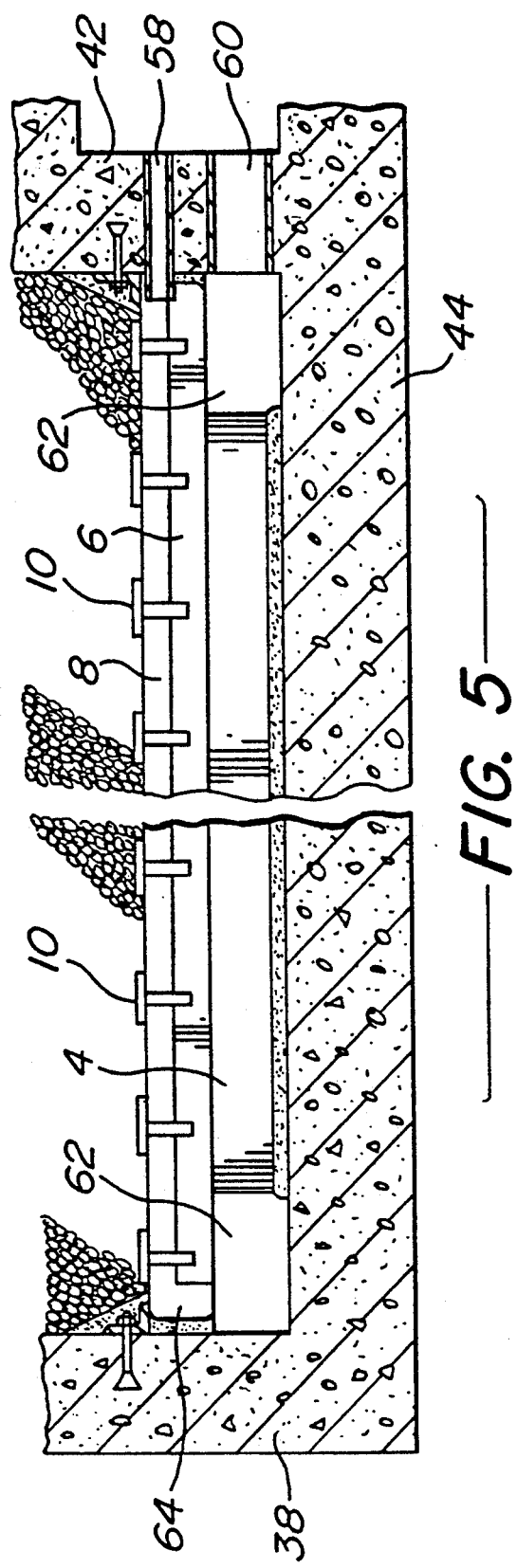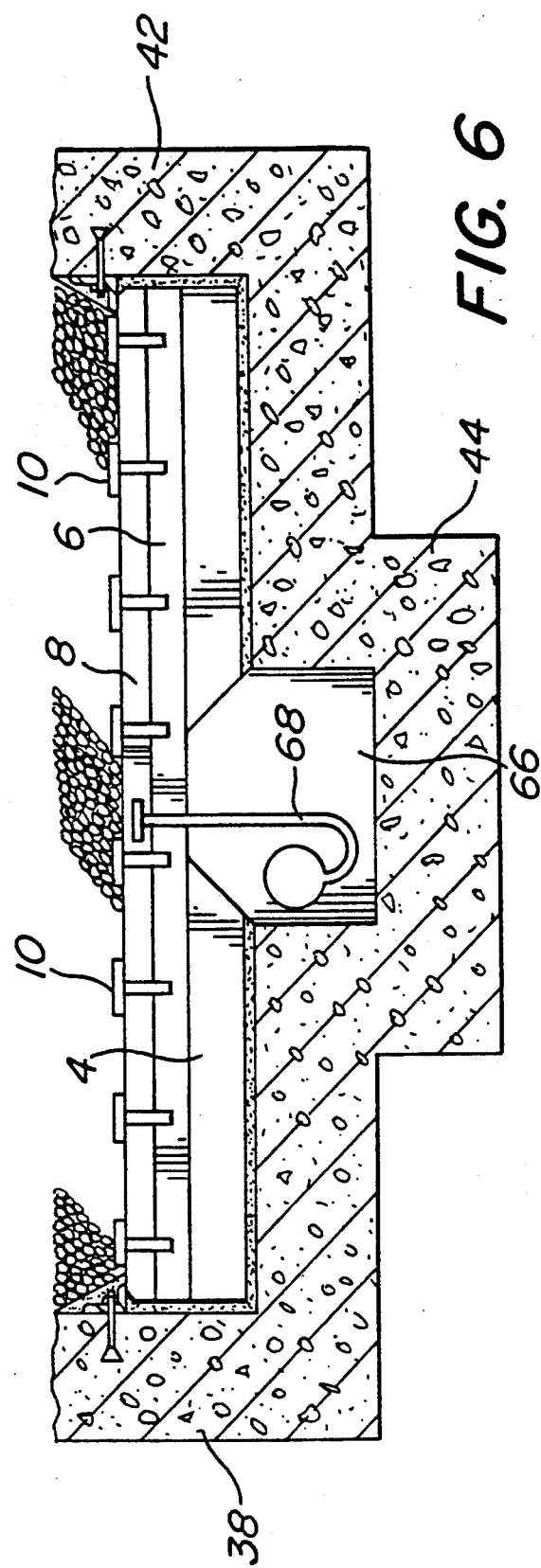

UNDERDRAIN FOR LIQUID PURIFICATION SYSTEMS

This is a continuation-in-part of co-pending continuation application Ser. No. 07/738,089, filed on Jul. 30, 1991 now U.S. Pat. No. 5,160,613, and a continuation of application Ser. No. 07/518,687, filed on May 3, 1990 now U.S. Pat. No. 5,068,034.

BACKGROUND OF THE INVENTION

This invention relates generally to collecting and distributing apparatus or underdrains which are part of liquid purification systems.

One method of purifying liquid uses filtration systems with filter beds having one or more layers of material. The top layer consists of a granular media which is made up of fine particulate matter such as anthracite, sand, carbon, or garnet. The next level below the granular filtration media comprises support or packing gravel. Underdrain laterals are placed below the layer of gravel. These are long narrow channels which are laid laterally across the width or length of the filter bed. A plurality of such underdrain laterals are placed side by side, so that the entire lower portion of the filter bed beneath the gravel layer is composed of the laterals.

The liquid to be filtered is applied across the top of the granular layer. As it seeps through the granular layer, waste material removed from the liquid accumulates and adheres to the particles of the granular layer. The liquid then flows through the granular layer through openings in the top of the underdrain laterals and then through a flume beneath the underdrain, through which the filtered liquid is discharged.

To maintain the efficiency of the filtering system, it is necessary to periodically clean the waste material from the granular and gravel layers. This is accomplished by the use of backwash water, which flows in the reverse direction through the filtration system. The backwash water is introduced at the flume beneath the underdrain. It flows upward through the underdrain into and through the gravel layer and the granular layer, from whence it is discharged.

In order to make the backwash process more efficient, a gas such as air is often used. The purpose of the gas is to sufficiently agitate the granular material to loosen and free waste material which has adhered during the filtering process. During the gas cycle, a water level slightly above the top of the granular level is maintained. After and or during the gas cleansing cycle, the backwash water is introduced to remove the waste material which has been loosened and freed by the gas.

Two approaches are used with regard to the cleansing of the filter media. In one approach, the gas cycle is used first and immediately followed by a cycle during which backwash water alone is used. Another approach is to use the gas cycle first and immediately follow with a cycle during which both gas and backwash water are introduced and flow through the filtration system simultaneously.

The use of the combined cycle of gas and backwash water is more efficient since the amount of water required is drastically reduced as compared to the backwash water required with a second cycle of backwash water only. Furthermore, the combination of gas and water for the second cycle provides a more efficient cleaning operation during the use of water alone. However, when the granular material is very fine, the combined cycle cannot be used because some granular material is carried away by the gas bubbles in the backwash water and lost.

A typical operation might be the use of gas only in the order of 3-5 standard cubic feet per minute per square foot of the filter bed 2-5 minutes. Then the gas at 2-5 standard cubic feet per square foot per minute is mixed with water at 5-7½ gallons per minute per square foot for 2-5 minutes. If the second cycle is backwash water only, up to 30 gallons per minute per square foot 3-5 minutes might be required depending on the filtration media.

The filter bottom of M. L. Stuppy, U.S. Pat. No. 3,110,667 specifies a block with two lower chambers alongside each other and two upper chambers, each one above a lower chamber. Ports between the lower chamber and the upper chamber provide compensation which assist in evening out the pressure distribution of the backwash water and lowering the amount of head pressure required. Stuppy however, does not provide for insertion of gas such as air to assist in the backwash process. The only way that gas can be applied in the backwash process in Stuppy is to add a network of pipes to supply gas above the gravel material level, which would be prohibitively expensive, or to add a network of pipes above the underdrain which would disturb the granular material and cause it to mix with the gravel. The finer granules could then clog the ports at the underdrain and seep into the underdrain. Maldistribution of granular material across the filter bed could also result.

Farrabough, U.S. Pat. No. 4,065,391, discloses an underdrain which provides for the use of the gas for cleansing. Chambers are formed by diagonal walls. This results in alternate chambers that mix gas and water with compensating orifices in the diagonal walls.

Sassano et al., U.S. Pat. No. 4,214,992 specifies a block with an air and water chamber in the center and water dispensing chambers on both sides. The chambers are formed with diagonal and straight walls and are rhombic in shape.

A major problem with the underdrains of Farrabough and Sassano is that when the gas and water mix in the chamber during the gas cycle, turbulence is often set up which creates standing waves which can become destructive. The turbulence often result in the mixing of the granular particles with the gravel, (six layers of gravel are required with Farrabaugh and Sassano underdrains), and the seepage of granular particles into the chambers which clog the orifices on the top of the underdrain and in the diagonal walls of the underdrain.

If the turbulence becomes severe enough, catastrophic damage can occur and has occurred, causing poor distribution of water and gas, damage to and breaking up of the underdrain, and lifting of the underdrain blocks or laterals off the filter bed floor.

Furthermore, it is not possible to connect the gas chambers from one underdrain lateral to another with cutouts to equalize the gas distribution. It is also not possible with the underdrains of Farrabough and Sassano to interconnect with cutouts the water chambers from one underdrain lateral to another to equalize water distribution.

OBJECTS OF THE INVENTION

Accordingly, it is the general object of the instant invention to provide an underdrain for liquid purification systems which overcomes the shortcomings of present structures.

It is a further object of the instant invention to provide an underdrain for liquid purification systems which provides for a minimal amount of turbulence in the water during the gas cleansing cycle and the combined gas and backwash water cycle.

It is still a further object of the instant invention to provide an underdrain for liquid purification systems which allows for cutout means for equalizing gas and water pressures and distribution between the parallel units of the underdrain laterals.

It is still yet a further object of the instant invention to provide an underdrain for liquid purification systems which comprises a primary chamber, a compensating chamber, and a separate gas chamber.

It is another object of the instant invention to provide underdrain for liquid purification systems which allows for easy manual adjustment of the level of the ports for the entry of backwash water to flow out of the underdrain, in order to equalize the water pressure at each port and to equalize the distribution of the backwash water.

It is still another object of the instant invention to provide an underdrain for liquid purification systems which minimizes the required depth of the gravel layer.

It is still yet another object of the instant invention to provide an underdrain for liquid purification systems which prevents the clogging of the input ports to the underdrain and the compensating orifices between the chambers of the underdrain with granular material.

It is an additional object of the instant invention to provide an underdrain for liquid purification systems which is inexpensive to manufacture and is easy to install and maintain.

It is yet an additional object of the instant invention to provide a horizontal baffle for, and a means for controlling the gas/backwash interface in, liquid purification systems not using laterals.

SUMMARY OF THE INVENTION

These and other objects of the instant invention are achieved by providing an underdrain comprised of laterals which have three chambers; a lower chamber or primary chamber, a middle chamber or compensating chamber, and a top gas chamber. Compensating orifices are placed in the separator wall between the compensating and primary chamber and in a horizontal baffle which defines the top of the compensating chamber and the bottom of the gas chamber. These compensating orifices and the horizontal baffle tend to equalize gas and water pressures during cleansing operations and to prevent turbulence or the creation of destructive standing waves during backwash.

A series of nozzle assemblies are placed in the top wall of the underdrain lateral along its length. Filtered water flows through distribution orifices in the top of the nozzle assembly through a threaded stem into the compensating chamber, to the primary chamber and through a flume from which it is discharged.

Parallel runs of the laterals comprising the chambers and nozzles assemblies are installed under the gravel layer. There are various types of gas and water distribution systems known to those familiar with the art. The instant invention may be used with front flume designs, wall sleeve designs and center flume designs, depending upon the size of the filter bed and other factors in the design and installation. Furthermore, the underdrain design of the instant invention allows for cutouts in each lateral between the parallel underdrain blocks which connect the primary chambers together to equalize water pressure, distribution and flow and which connect the gas chambers together to equalize gas pressures and flow.

For liquid purification systems which do not use laterals, a support base is installed in the filter tank with nozzle assembles emplaced in the support base, and a horizontal baffle installed below the support base. Gas is pumped into the area between the support base and the horizontal baffle. Orifices in the stem of the nozzle assembly set the position of the gas/backwash water interface.

DESCRIPTION OF THE DRAWING

Other objects of many of intended advantages of this invention will be readily appreciated when the same becomes better understood by reference to the following detailed description when considered in connection with the accompanying drawings wherein:

FIG. 5 is a cross-sectional view of a filter bed using a wall sleeve distribution system.

FIG. 6 is a cross-sectional view of a filter bed using a center flume distribution system.

DETAILED DESCRIPTION OF THE PREFERRED EMBODIMENTS

Figure 1:
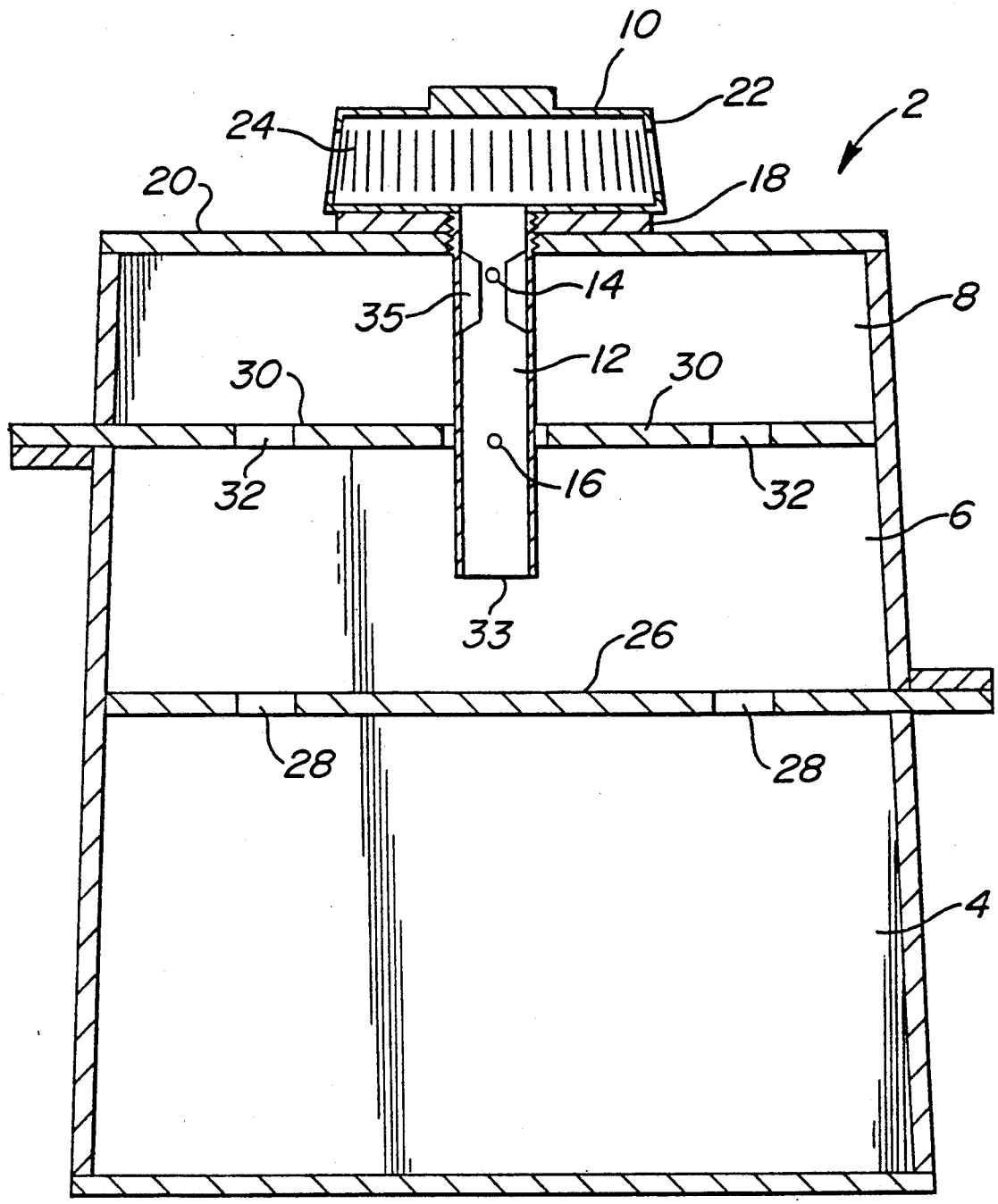
FIG. 1 is a cross-sectional view of an underdrain lateral installed at the bottom of the filtering system.

Referring now in greater detail to the various figures of the drawing, wherein like reference characters refer to like parts, there is shown in FIG. 1 a vertical cross sectional view of an underdrain lateral 2 of the present invention. As shown in FIG. 1, the underdrain lateral 2 comprises a lower, primary chamber 4, a middle, compensating chamber 6 and an upper, gas chamber 8. Nozzle assembly 10 has a threaded stem 12 with orifices 14 and 16 for gas input into the filter bed during cleansing.

The nozzle assembly 10 is located on a spacer 18 which is positioned on top wall 20 of the underdrain lateral 2. The inner surfaces of the spacer 18 and the top wall 20 formed by a hole for placement of the cylindrical stem 12, are threaded to accept the threads at the top of the threaded stem 12. Distribution orifices 24 are placed in upper member 22 of the nozzle assembly 10. The distribution orifices 24 are made small to prevent passage of any granular material which has settled into the gravel packing level during filtering and during cleansing.

Formed in the separator wall 26, which defines the top of the primary chamber 4 and the bottom of the compensating chamber 6 are compensating orifices 28 which equalize water distribution and pressures during the filtering and the gas and backwash cycles. A horizontal baffle 30 separates the compensating chamber 6 from the gas chamber 8. The horizontal baffle 30 contains orifices 32 which equalize gas and water pressure during the filtering and the gas and backwash cycles.

Figure 3:
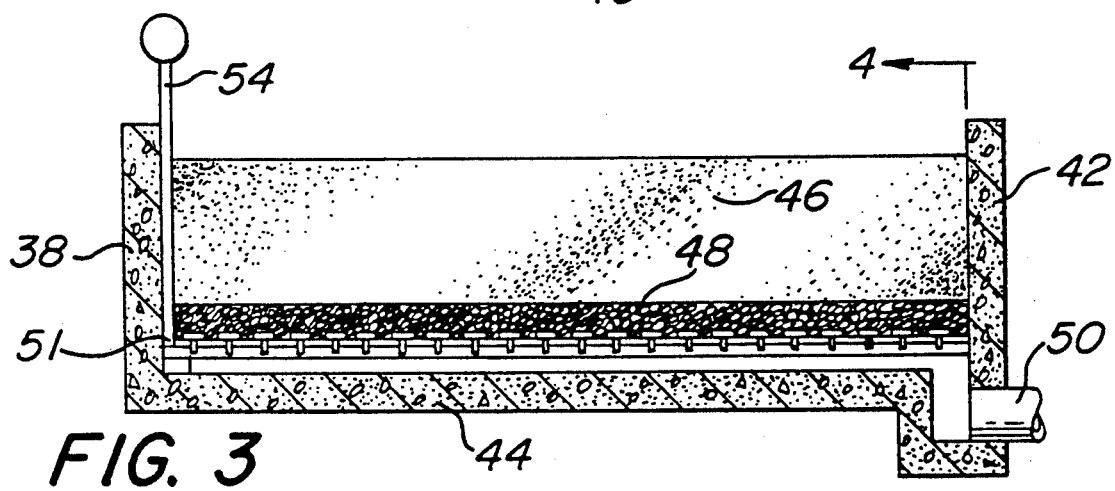
FIG. 3 is a vertical cross-sectional view of the filtering system which shows the granular media and gravel packing levels and the underdrain laterals taken along the line 3—3 of FIG. 2.

As will be described in detail later, during filtering of waste water, the water flows through the granular media level and then through the gravel packing level as shown in FIG. 3, through distribution orifices 24 and into the threaded stem 12. The waste water then flows through orifices 28 and then out through a liquid flume from which it is discharged.

During backwash water is forced back into the system first through the primary chamber 4 then into the compensating chamber 6 and out through the threaded stem 12. It then flows through the distribution orifices 24 into the gravel layer and upward into and through granular layer from whence it is conducted out of the filtering system and discharged.

For greater cleansing efficiency a gas is introduced into the gas chamber 8. The gas flows through orifices 14 and 16 into threaded stem 1 and out of the distribution orifices 24 through the gravel layer and then through the granular layer. The gas bubbles formed agitate the granular material so as to loosen accumulated waste material which was formed during the filtering cycle.

After the gas cycle, a backwash cycle is initiated so that backwash water flows through the gravel and media layers removing and carrying away the waste material which was loosened during the gas cycle. As described previously, it is more efficient to follow the gas cycle with a combined gas and backwash water cycle then to follow the gas cycle with a backwash cycle only. However, a combined cycle cannot be used when the granular media is very fine since the granular material would be carried away in the gas bubbles by the backwash water.

During the gas cycle, a water level above the granular level is maintained. The gas entering the gas chamber 8 forces the water in the underdrain downward until the level of the water is slightly below the top of the compensating chamber 6. Water enters at the opening at the bottom of the cylindrical threaded stem 12 and gas enters the threaded stem 12 through the orifices 14 and 16. The gas and water then go through the distribution orifices 24 and then rise through the gravel and granular levels from whence they are discharged. This process loosens and removes the waste material which has accumulated on the granular particles.

After the gas cycle which was described above, a cycle of backwash water or a combined cycle of backwash water and gas may be used to clear away the waste material which has been loosened during the gas cycle.

The underdrain prevents turbulence during the gas and backwash water cycles as compared to underdrains in present use. With the water level in the compensating chamber 6 just below the horizontal baffle 30, the amplitude of standing waves is reduced and water turbulence does not occur as in existing devices. Furthermore, the threaded portion of the stem 12 enables, during installation and maintenance, the setting of the entrances 33 of the various stems 12 to exact levels above the underdrain floor to assure that the water pressure and flow entering the various stems 12 are equalized throughout the entire filtering system. Also by placing all stems at the same level, the orifices 14 and 16 are positioned for even gas pressure and flow in the filtering system.

The inside diameter of threaded stem 12 may be reduced by inserts 35 placed near the orifice 14 to reduce pressure during backwash allowing greater gas flow through the orifice 14.

Figure 2:
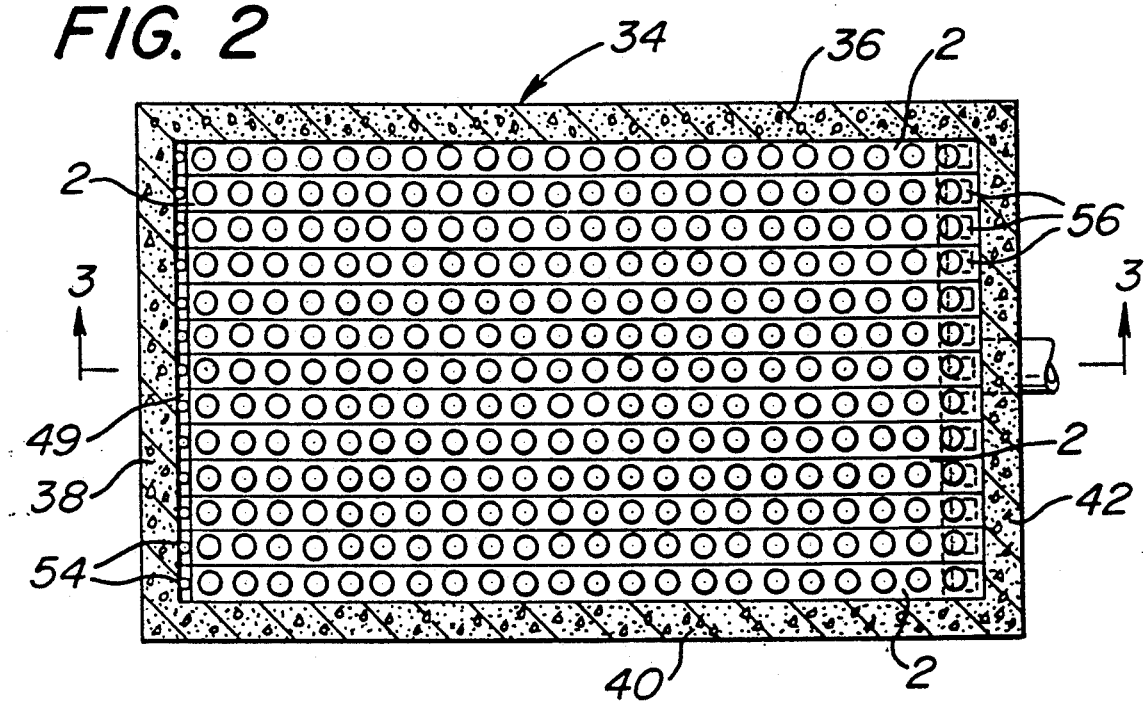
FIG. 2 is a plan view of the underdrain showing the top of the underdrain laterals and the nozzle assemblies of the underdrain.

FIG. 2 shows a plan view of the underdrain laterals 2. Each underdrain lateral 2 extends laterally across the width or length of filter bed 34. The array of the nozzle assemblies 10 are shown in the view. At the left are the gas inlet pipes 54 which feed gas into each of the underdrain units 2. The filter bed 34 comprises side walls 36, 38, 40 and 42. Shown dotted on the right hand side of FIG. 2 are cutouts 56 which connect the primary chambers 4 of the underdrain laterals 2 together to equalize water flow and pressure in the underdrain.

FIG. 3 shows a vertical cross section of the filtering system along the line 3—3 of FIG. 2. As can be seen in layer of granular material 46 is placed above a layer of gravel 48. The underdrain laterals 2 cover the bottom 44 of the filtering bed 34 beneath the gravel layer 48. Gas inlet pipes 54 are placed in gas distribution chamber 49 for feeding gas into each of the gas chambers 8 of the underdrain laterals 2. Cutouts 51 at the end of each of the underdrain laterals 2 connect the gas chambers 8 to equalize gas pressure and allow an equal flow of gas throughout all the gas chambers 8.

Below the underdrain laterals 2 is a liquid flume 50 through which the filtered water exits and into which backwash water flows during the backwash cycle.

Figure 4:
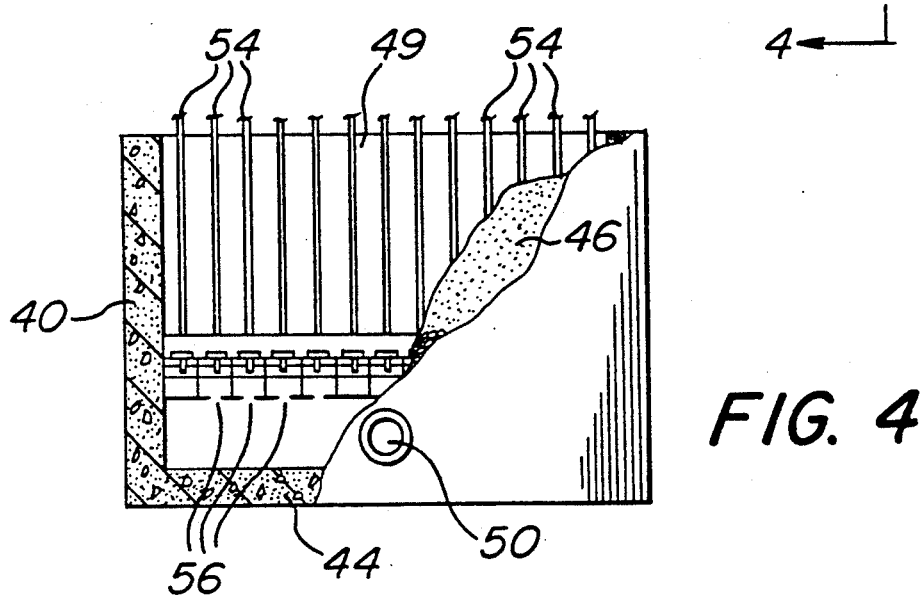
FIG. 4 is a partial, cross-sectional view taken along the line 4—4 of FIG. 3 which shows the gas inlet pipes for a front flume distribution system.

The gas inlet pipes 54 are placed at the front of the filter bed 34 are shown in FIG. 4, which is a partial cross sectional view taken along the line 4—4 of FIG. 3. As can be see in FIG. 4 cut outs 56 in the bottom of the primary chambers 4 at each end of each underdrain blocks 2 provide for equalization of water pressure and water flow throughout the underdrain.

As is well known to those skilled in the art, various arrangements with regard to water and gas distribution are in common use. The arrangement shown in FIGS. 2, 3, and 4 is a front flume design. In addition to the front flume design, water and gas distribution can be achieved through a wall sleeve design as shown in FIG. 5 or through a center flume design as shown in FIG. 6. The choice of distribution design depends upon the size of the filtering system, the amount of water to be filtered, and various other considerations with regard to any specific installation. However, the instant invention is applicable to all such arrangements.

A wall sleeve water and gas distribution system with the present invention is shown in FIG. 5. Both gas inlet pipes 58 and liquid flume 60 are in placed in side wall 42. Cutout 62, at both ends of underdrain lateral 2 connect the primary chambers 4 of each lateral 2 together to assure equal distribution of water pressure and flow throughout the underdrain. Similarly, the gas chambers 8 of the underdrain laterals 2 are connected together at one end of the laterals 2 by cutouts 64 which equalizes gas pressure and flow throughout the underdrain.

FIG. 6 shows a center flume gas and water distribution system. Liquid flume 66 is shown centered in bottom wall 44. Gas distribution also takes place centrally. The gas enters into the gas chambers 8 via J tube 68. Cutouts (not shown) may also be used to equalize water and gas pressures and flow.

Figure 7:
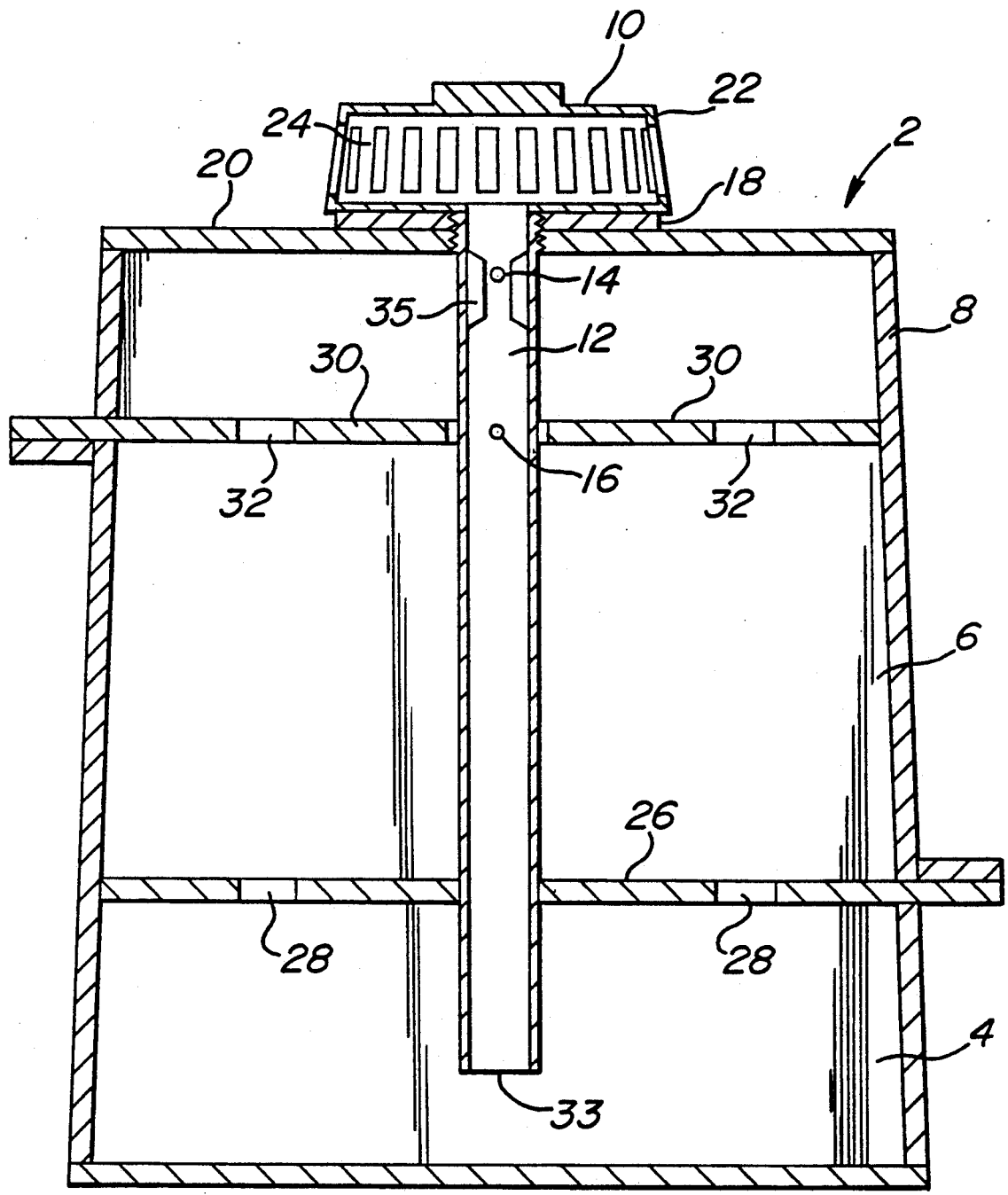
FIG. 7 is a cross-sectional view of the underdrain lateral of the alternative embodiment.
Figure 8:
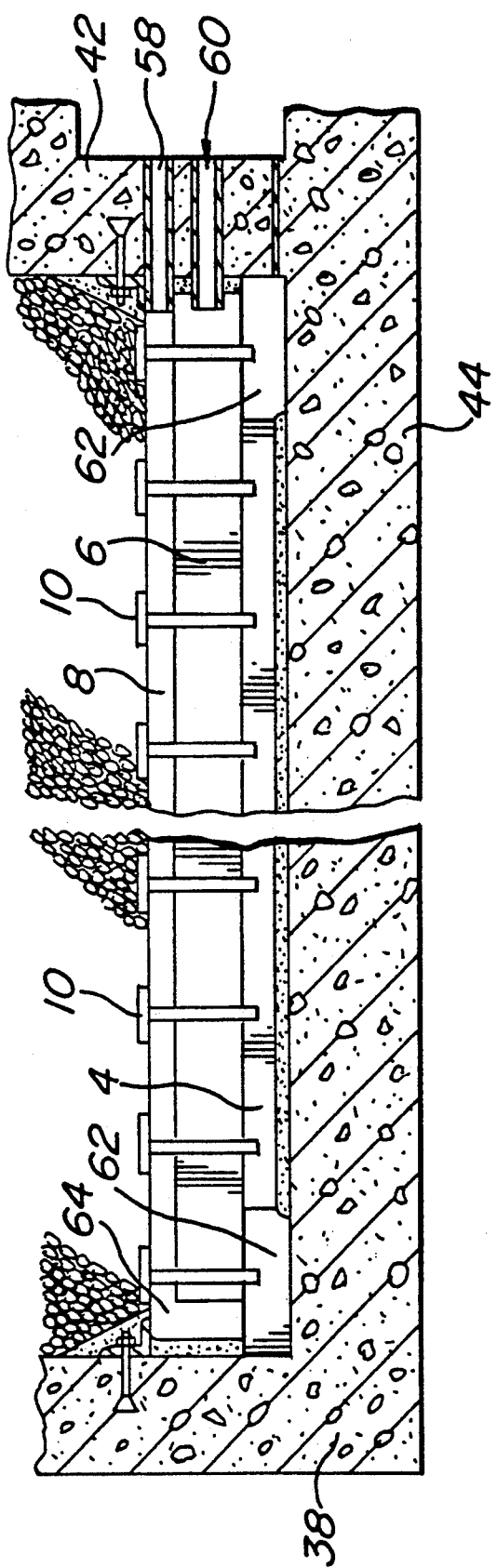
FIG. 8 is a cross-sectional view of a filter bed using a wall sleeve distribution system with the alternative embodiment.

An alternative embodiment of the invention is shown in FIGS. 7 and 8. In this embodiment, the distribution orifices 24 in the upper member 22 of the nozzle assembly 10 are made larger. The dimensions of the distribution orifices 24 of the alternative embodiment are ⅛ inch wide by 1 inch long as compared to 1/32 inch wide by 1 inch long in the first embodiment. Also as can be seen in FIGS. 7 and 8, the threaded stem 12 is made longer so that entrance 33 is in the lower chamber 4. In addition, the middle chamber 6 is made longer and the lower chamber 4 is shortened.

Also in this alternative embodiment, the functions of the chambers 4 and 6 are reversed. Chamber 6 is the primary chamber into which the backwash water is inserted. The lower chamber 4 is now the compensating chamber.

FIG. 8 is a cross-sectional view of a filter bed with a wall sleeve distribution system using the alternative embodiment. As can be seen in FIG. 8, backwash water enters through liquid flume 60 into the middle primary chamber. The upper chamber 8 remains the gas chamber as in the first embodiment and gas enters through gas inlet pipes 58.

The alternative embodiment is intended to guard against the possibility that after about five years of service, waste material might clog the openings of the distribution orifices 24. The orifices 24 are therefore made wider. This necessitates three to four layers of the gravel 48 beneath the granular material 46. The larger size gravel is placed in the lower layer with each higher layer being successively of smaller size with the smallest size gravel in the top layer, beneath the granular layer. In the first embodiment, on the other hand, only one gravel layer is required because smaller size gravel can be used abutting the nozzle assembly 10, because the openings of the distribution orifices 24 are much narrower.

With this system it is possible that large gulps of air entering with the backwash water could lift the finer gravel which could be washed out when the backwash water is discharged. Therefore, the threaded stem 12 made longer so that the entrance 33 was considerably below the backwash intake into the middle chamber 6 to prevent air from entering into the threaded stem 12 and thence through the distribution orifices 24 rising up through the gravel layers.

Figure 9:
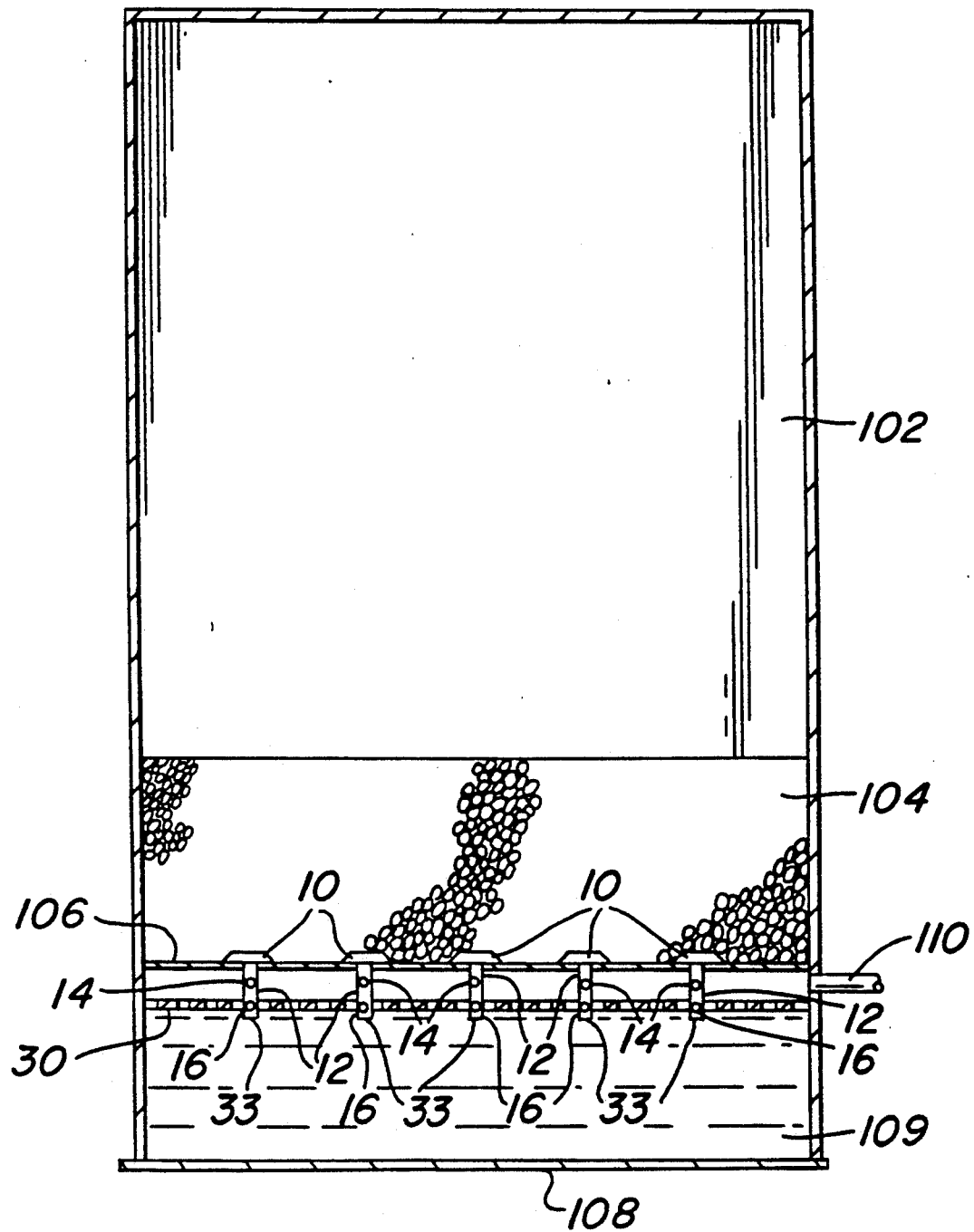
FIG. 9 is a cross-sectional view of water purification filter tank which does not employ laterals, wherein the horizontal baffle of the instant invention is installed directly in the plenum to prevent turbulence during cleansing operations.
Figure 10:
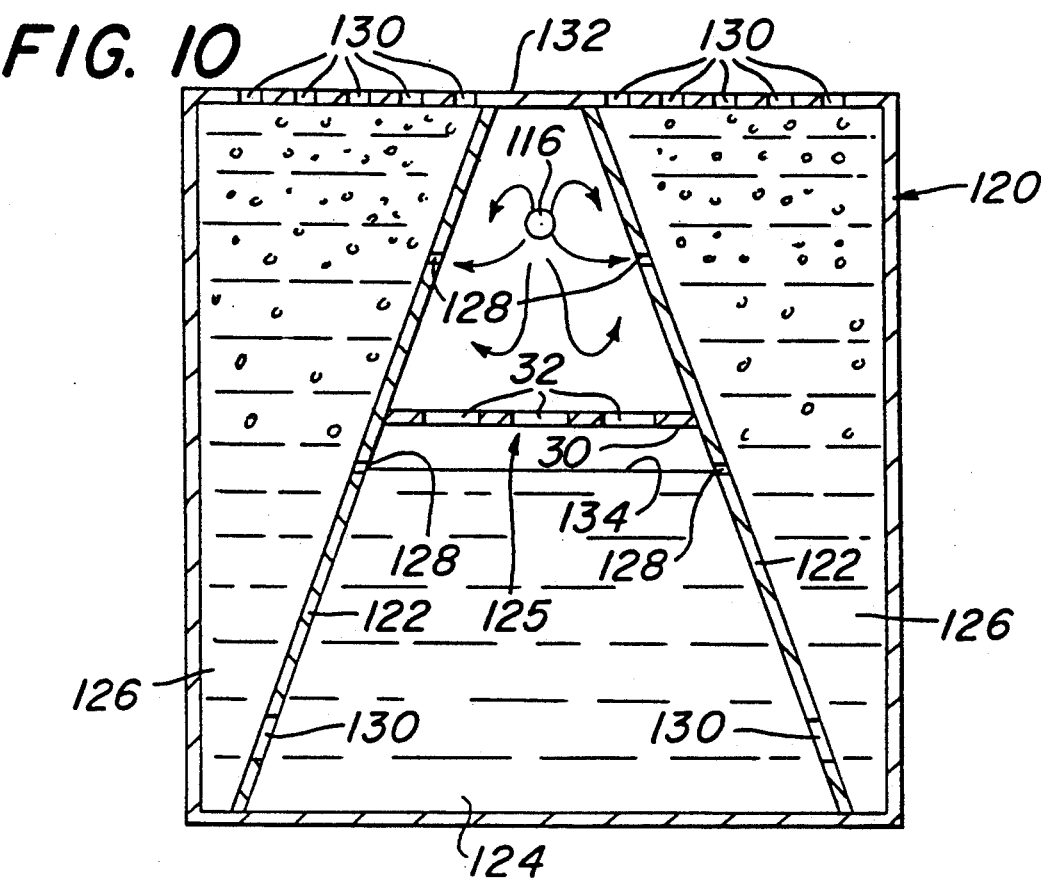
FIG. 10 shows the horizontal baffle of the instant invention installed in the central chamber of an underdrain having chambers with diagonal walls.
Figure 11:
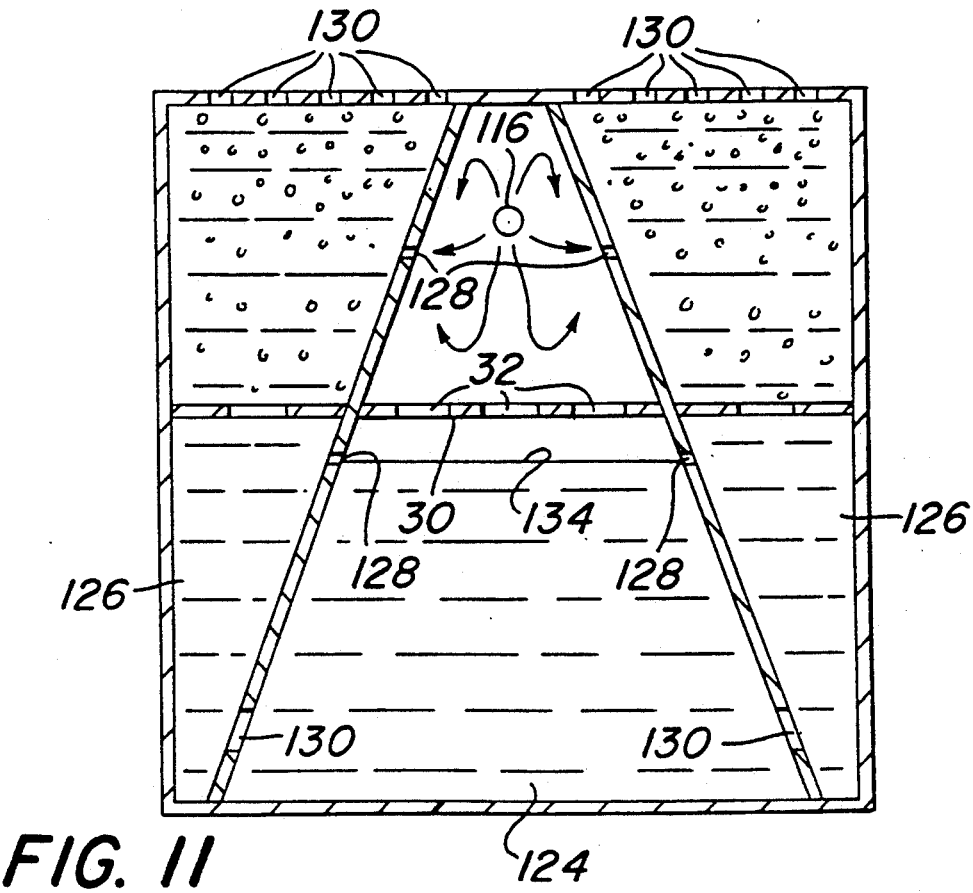
FIG. 11 shows the horizontal baffle of the instant invention installed in all three chambers of the underdrain of FIG. 10.

Other embodiments of this invention, which isolate gas from backwash water during the cleansing process, are shown in FIGS. 9, 10, and 11. FIG. 9 shows the implementation of this invention to a plenum type system, without underdrain laterals. A support base 106 is placed in filter tank 102. Nozzle assemblies 10 are installed in the support base 106. Filter media 104 comprising, layers of fine particulate matter on top of packing gravel, is placed on the support base 106. As previously described, each nozzle assembly 10 has a stem 12 with upper and lower orifices 14 and 16 respectively. A horizontal baffle 30 is installed below the false bottom and supported by direct attachment to the walls of the filter tank 102 or with supports mounted on the bottom 108 of the filter tank 102 (not shown).

During cleansing operations, backwash water flows into the bottom of plenum 109 and gas under pressure is admitted into the area between the support base 106 and horizontal baffle 30, via pipe 110.

As is well-known to those versed in the art, gas flowing into orifices 14 and 16 which are vertically disposed to one another, will tend to maintain the gas/water interface level at or near the position of the lower orifice 16. Because the lower orifice 16 is located near the horizontal baffle, the possibility for large standing waves at the gas/water interface is eliminated, which minimizes the destructive turbulence which might otherwise occur.

As is the case with embodiments 1 and 2, the backwash water enters into the stems 12 through entrance 33 where it is mixed with gas entering orifices 12 and 16. Then the water and gas mixture flows through the upper member 22 of the nozzle assembly 10 up through the filter media to dislodge waste material which has adhered during the filtering process.

As also described previously in embodiments 1 and 2, the horizontal baffle 30 includes orifices 32 which equalize gas and water pressure during the filtering and cleansing cycles. Furthermore, the horizontal baffle 30 prevents the flow of gas under pressure across the surface of the backwash water, which further reduces turbulence.

FIGS. 10 and 11 show two additional embodiments of this invention as used with laterals having central and side chambers. As can be seen in FIG. 10, lateral 120 has diagonal walls 122 which separate the lateral into a central chamber 124 and two side chambers 126. Backwash water, during cleansing, is pumped into the lower portion of the central chamber 124. It enters into side chambers 126 through water openings 130. Gas under pressure enters the upper portion of central chamber 124 through pipe 116. The diagonal walls 122 also have gas openings 128. Therefore, as the water rises through the side chambers 126 the gas mixes with the water as can be seen by the gas bubbles in the FIGURE. As in the case with the nozzle stem 12, the gas openings 128 are vertically disposed to one another in each of the diagonal walls 122. The gas enters into the area of the central chamber 125 above or below the horizontal baffle 30 through orifices 32. As previously described, the gas/backwash water interface 134 occurs at or near the lower gas opening 128 in the sidewalls 122 as shown in the diagram. The establishment of the interface near the horizontal baffle 30 prevents destructive turbulence at that interface. Openings 130 in the top wall 132 of the lateral 120 allow the water and gas to flow upward into and through the filter media to cleanse the filter media.

FIG. 11 is similar to the embodiment of FIG. 10 except that the horizontal baffle extends into the side chambers 126. The gas/backwash water interface 134 is again established at the lower gas opening 128 close to the horizontal baffle, as in the previous embodiment. The gas is pumped into the upper portion of the central chamber 124 through pipe 116 and exits through the gas openings 128. Therefore, the gas mixes with water as shown by the gas bubbles in FIG. 11 and the gas/backwash water mixture exits the lateral 120 through openings 130 in the top wall 132 of the lateral 120.

An underdrain system which provides for several clear and important advantages over the previous and current art has been described. These include the use of a gas cleansing cycle and a backwash liquid cycle or a combined gas and backwash liquid cycle wherein turbulence in the liquid is minimized. Existing systems often create sufficient turbulence to result in the mixing of the granular media with the gravel, causing clogging of orifices which jams the system. Furthermore, the disturbances are sometimes severe enough to cause catastrophic results such as the lifting or breaking up of the laterals of the underdrain.

The reduction in turbulence during the cleansing cycles allows for the reduction of the amount of granular media required as less mixing between the granular and gravel layers occurs as well as less shifting of granular materials causing unequal amounts of material at various locations in the filter bed. While the systems in common use today require six layers of gravel, the first embodiment of this invention requires only one layer of gravel, while the second embodiment requires only three or four layers of gravel.

The underdrain laterals 2 may be composed of ceramic, fiber glass, plastic, metal or any other suitable material.

The instant invention also provides an easy means for leveling the backwash liquid intakes to provide for even liquid distribution by rotating the threaded stems of the nozzles. Also, through the use of cut outs in the underdrain laterals 2, gas and liquid pressures and flow are equalized within each of the underdrain laterals and throughout the filter bed 34.

Although the embodiments described herein use filtration to purify waste water it should be noted that the instant invention is equally applicable to other methods of purification and to purify liquids other than waste water.

The system isolates high velocity gas during the cleansing process during which gas is mixed with water and forced back up through the filter media to dislodge waste material and to cleanse the filter media. The first two embodiments have shown the use of this system which prevents turbulence at the gas/backwash water interface during cleansing operations, with laterals having vertically disposed chambers. Alternatively, the system can be used with purification systems which do not employ laterals as shown in FIG. 9 and with systems using laterals with side by side chambers as shown in FIGS. 10 and 11.

Without further elaboration, the foregoing will so fully illustrate my invention that others may, by applying current or future knowledge, readily adapt the same for use under the various conditions of service.

We claim:

1. A liquid purification system comprising:
   (a) a filter tank having sidewalls and a bottom wall containing filter media;
   (b) a support base mounted in said tank;
   (c) a means for cleansing said filter media using gas and backwash water; and
   (d) a means for preventing turbulence in said backwash water comprising:
      (i) a horizontal baffle mounted in said filter tank below said support base; and
      (ii) a means for injecting said gas into the area between said support base and said horizontal baffle;
      (iii) a means for preventing the entrance of said backwash water into said area;
   and wherein said horizontal baffle comprises means for providing for the passage of said gas from said area between said support base and said horizontal baffle to the area between said baffle and said bottom wall, comprising a plurality of openings in said baffle.

2. The system of claim 1 wherein said gas and backwash water have an interface and the system further comprises means to control the position of said gas and backwash water interface.

3. The system of claim 2 wherein said means to control the position of said interface comprises at least one nozzle assembly mounted in said support base, said at least one nozzle assembly comprising an upper member and a lower member.

4. The system of claim 3 wherein lower member comprises a hollow stem having a cylinder wall, and said wall comprises a plurality of orifices.

5. The system of claim 4 wherein said plurality of orifices comprises a first orifice and a second orifice below said first orifice.

6. The system of claim 5 wherein system has a means for varying the positions of said orifices relative to said horizontal baffle, said varying means comprising threads on said stem which mate with threads in said upper member.

7. A system for purification of liquids comprising:
   (a) a filter tank having a filter media;
   (b) at least one lateral having a generally rectangular shape comprising a pair of diagonal internal walls forming a central chamber and a pair of side chambers, a respective one of said side chambers being located on each side of said central chamber;
   (c) a means for cleansing said filter media using backwash water and gas; flowing through said at least one lateral;
   (d) in each of said at least one lateral, a means for preventing turbulence in said backwash water comprising:
      (i) a horizontal baffle mounted in the central chamber, said horizontal baffle dividing said central chamber into an upper chamber and a lower chamber;
      (ii) a means for injecting said gas into said upper chamber and for injecting backwash water into said lower chamber; and
   wherein said horizontal baffle comprises means for providing for the passage of said gas from said upper chamber to said lower chamber comprising first plural openings in said baffle.

8. The system of claim 7 wherein in each of said at least one lateral said gas and backwash water have an interface and wherein said system further comprises means to control the position of said interface.

9. The system of claim 8 wherein in each of said at least one lateral, said means to control the position of said interface comprises a plurality of gas orifices in said diagonal walls.

10. The system of claim 9 wherein in each of said at least one lateral, plurality of gas orifices comprise, in each diagonal wall, a first gas orifice and a second gas orifice located below said first gas orifice.

11. The system of claim 10 wherein in each of said at least one lateral, said diagonal walls comprise second openings for the passage of backwash water from said central chamber into said side chambers.

12. The system of claim 13 wherein in each of said at least one lateral, said side chambers comprise top walls and said top walls have third openings for the passage of gas and backwash water out of said lateral.

13. A system for purification of liquids comprising:

(a) a filter tank having a filter media;
(b) at least one lateral having a rectangular shape and comprising diagonal internal walls forming a central chamber, said central chamber having sides defined by said diagonal walls and a pair of side chambers;
(c) a means for cleansing said filter media using backwash water and gas flowing through said at least one lateral;
(d) in each of said at least one lateral, a means for preventing turbulence in said backwash water comprising:
   (i) a horizontal baffle means mounted in said central chamber and said side chambers, a respective one of said side chambers being located on each side of said central chamber, said horizontal baffle dividing said central chamber into an upper chamber and a lower chamber; and
   (ii) a means for injecting said gas into said upper chamber and for injecting backwash water into said lower chamber; and
wherein said horizontal baffle means comprises means for providing for the passage of said gas from said upper chamber to said lower chamber, comprising first plural openings.

14. The system of claim 13 wherein in each of said at least one lateral, said gas and backwash water have an interface in said central chamber and wherein said system further comprises means to control the position of said interface.

15. The system of claim 14 wherein in each of said at least one lateral, said means to control the position of said interface comprises a plurality of gas orifices in said diagonal walls.

16. The system of claim 15 wherein in each of said at least one lateral, plurality of gas orifices comprise, in each diagonal wall, a first gas orifice and a second gas orifice located below said first gas orifice.

17. The system of claim 16 wherein in each of said at least one lateral, said diagonal walls comprise second openings for the passage of backwash water from said lower chamber into said side chambers.

18. The system of claim 17 wherein in each of said at least one lateral, said side chambers comprise top walls and said top walls have third openings for the passage of gas/backwash water out of said lateral.

* * * * *